United States Patent [19]

Holmes et al.

[11] Patent Number: 4,564,350
[45] Date of Patent: Jan. 14, 1986

[54] PLASTIC EXTRUDER ASSEMBLY

[75] Inventors: George Holmes, W. Chicago; Frank Keyser, Streamwood, both of Ill.

[73] Assignee: Thomas R. Vigil, Barrington, Ill.

[21] Appl. No.: 715,058

[22] Filed: Mar. 22, 1985

Related U.S. Application Data

[63] Continuation of Ser. No. 386,873, Jun. 10, 1982, abandoned.

[51] Int. Cl.$^4$ .............................. B29F 3/04; B29F 3/08
[52] U.S. Cl. .................................... 425/313; 425/192 S;
425/378 S; 425/464
[58] Field of Search ................. 425/191, 192 R, 192 S,
425/463, 461, 464, 378 R, 378 S, 379 R, 379 S,
313, 311

[56] References Cited

U.S. PATENT DOCUMENTS

| | | | |
|---|---|---|---|
| 2,524,751 | 10/1950 | Berger | 425/313 |
| 2,850,764 | 9/1958 | Evans et al. | 264/143 |
| 3,372,215 | 3/1968 | Muirhead et al. | 264/142 |
| 3,475,789 | 11/1969 | Stroup et al. | 425/464 |
| 3,553,776 | 1/1971 | Romagano et al. | 264/142 |
| 3,599,285 | 8/1971 | Hamilton | 425/313 |
| 3,605,187 | 9/1971 | Wurster et al. | 264/142 |
| 3,618,162 | 11/1971 | Schaver et al. | 425/311 |
| 3,867,082 | 2/1975 | Lambertus | 425/313 |
| 3,981,959 | 9/1976 | Cuff | 264/142 |
| 4,123,207 | 10/1978 | Dudley | 425/67 |
| 4,187,067 | 2/1980 | Mizuno et al. | 425/313 |
| 4,221,753 | 9/1980 | Bradbury | 264/142 |
| 4,248,577 | 2/1981 | Borg et al. | 264/177 F |
| 4,264,553 | 4/1981 | Loo | 264/142 |
| 4,285,652 | 8/1981 | Anders | 264/142 |
| 4,327,050 | 4/1982 | Salmon | 264/142 |

FOREIGN PATENT DOCUMENTS

WO81/00019 1/1981 PCT Int'l Appl.

Primary Examiner—Willard E. Hoag
Attorney, Agent, or Firm—Thomas R. Vigil

[57] ABSTRACT

The plastic extruder assembly is of the type that includes an extruder barrel assembly and an extruder die chamber in the distal end of the extruder barrel assembly. The die chamber has means for receiving and mounting a die assembly therein and the die assembly has die holes extending therethrough to an outer face. A layer of insulating material is provided beneath the outer die face at least in the area of the die holes for inhibiting if not altogether preventing freezing of the plastic in the die holes. Also, radial and circumferential hot oil passageways are provided in the die assembly and the die holes are offset in either a concentric array or a series of spirals.

12 Claims, 9 Drawing Figures

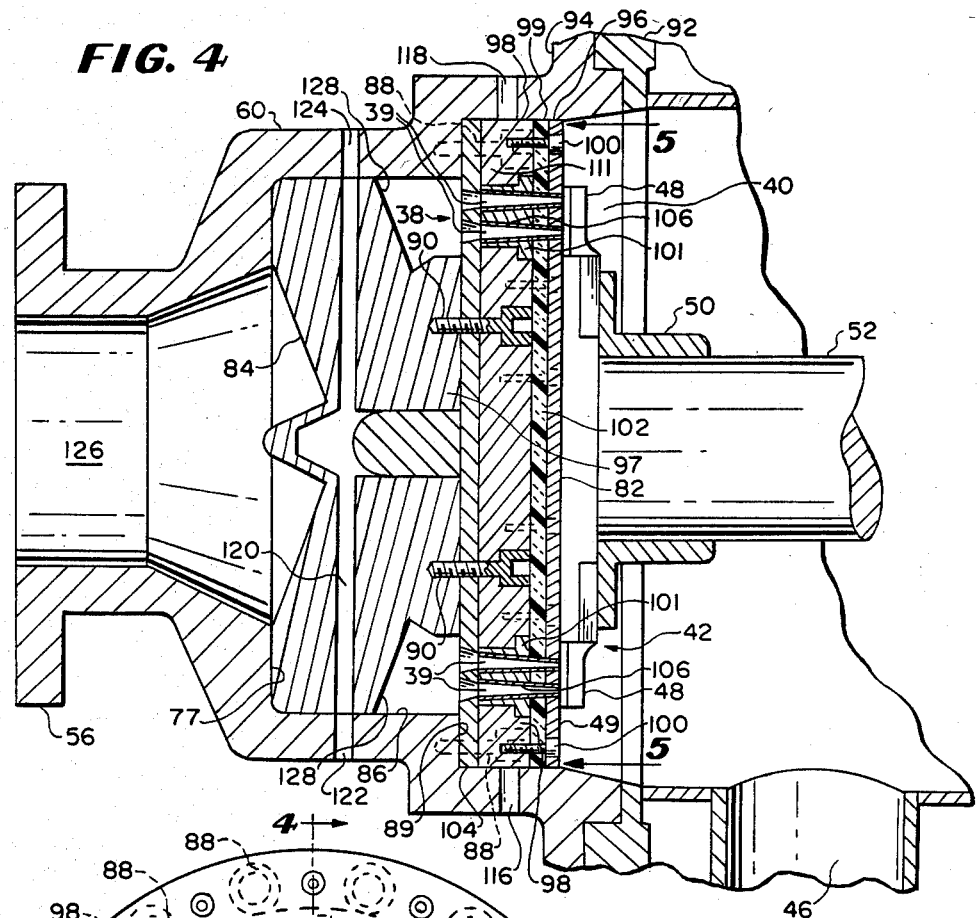
FIG. 4
FIG. 5
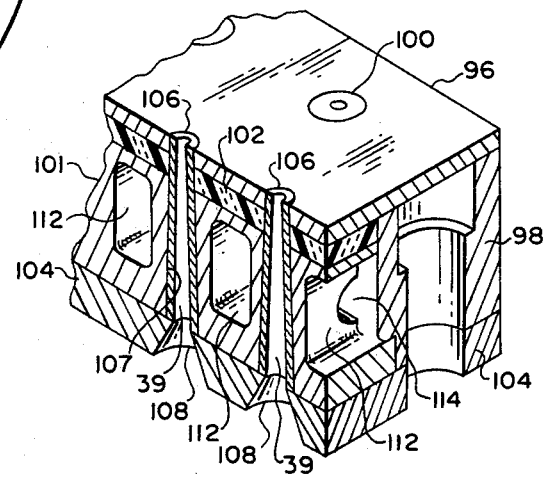
FIG. 6

PLASTIC EXTRUDER ASSEMBLY

This is a continuation of application Ser. No. 386,873, filed June 10, 1985 and now abandoned.

BACKGROUND OF THE INVENTION

1. Field of the Invention

The present invention relates to a plastic extruder assembly and more specifically to a die assembly having means for keeping the die head of the assembly insulated from an outer die face to inhibit freezing of the molten plastic as it is extruded through the die assembly.

2. Description of the Prior Art

Extruders for extruding plastic material into a molten stream of plastic material have been known and used for some time. A particular use of such an extruder is in conjunction with a pelletizer which is mounted to one end of the extruder. By way of example, the extruder may include an inlet feed hopper positioned above a barrel of the extruder assembly. A feed screw is positioned in the extruder assembly, and rams are mounted for movement in the hopper for the purpose of pushing lumps of molten plastic material (such as batches of pigmented polyethylene) into engagement with the feed screw for movement of the plastic material toward the forward end of the barrel of the extruder assembly. The plastic then passes through a die head in a die assembly and the plurality of streams of plastic exiting from the die assembly are typically cut into pellets by a pelletizer.

One particular use of an extruder of the type described is in connection with a pelletizer which may be mounted to the end of the extruder. The preferred embodiment of the present invention will be described with reference to such a specific extruder and pelletizer apparatus, however, it is to be understood that the novel features of the present invention can be adapted to the die assembly of any extruder, used with or without a pelletizer. The extruder of the preferred embodiment includes a die head having a plurality of holes therein. The die head is mounted at the end of the extruder with an outer die face plate. The pelletizer used in conjunction with the extruder, is disposed at the exit of the extruder such that the die assembly also forms part of the entrance to the pelletizer assembly. The pelletizer includes a rotating cutter having cutting blades positioned adjacent the die face of the face plate from which streams of molten plastic material flow. The rotating cutter assembly cuts the streams of plastic material into pellets of various sizes depending upon tnhe extrusion flow rate through the holes in the die head and the speed of rotation of the cutter assembly In some pelletizers, the flow of water in the chamber housing the cutter assembly serves to carry the pellets into a receiving container.

In extruder devices where the plastic streams are formed by passing molten plastic through holes in a die head, the holes tend to clog when some of the molten plastic freezes or hardens so as to decrease the diameter of the die hole. Such freezing causing reduction of the diameter of the die hole obviously impedes the flow of plastic resulting in "off-spec" pellets and if one or more die holes are frozen shut, the number of streams of plastic being produced at a given time is reduced. Both phenomenon substantially reduce the efficiency of the apparatus.

Accordingly, it is desirable to provide a die assembly for an extruder of the type described wherein build up in or complete clogging of die holes is reduced if not obviated, whenever clogged die holes may be readily unclogged, and wherein die hole diameters can be changed to vary the size of the plastic stream produced by the extruder. In most present die assemblies, it is necessary to remove the entire die head to unclog die holes.

Also, it is desirable to provide means for easily changing the size of the die holes since in present die assemblies it is necessary to remove and replace an entire die plate assembly if die holes of a different size are desired.

In addition, it is desirable to provide an efficient system for heating the plastic just prior to its being passed through the holes in the die assembly, and for ensuring that the temperature of the die assembly is maintained at an elevated state as the extruding process proceeds.

Also, it is desirable to construct a die assembly having the die holes therein disposed in such an array that the entire length of the cutter blade is sequentially used in cutting the plastic streams into pellets, rather than having only one small section of each blade come into contact with the plastic. This prevents excessive wear at one location on the blades, and vastly increases the useable life of the blades.

As will be described in greater detail hereinafter, the extruder apparatus of the present invention provides an insulating device between a die face plate having an outer die surface adjacent which the cutters rotate and a die head or body having die holes therein to prevent freezing of the molten plastic in the die holes.

In addition, the present invention provides a die assembly for an extruder of the type described which allows clogged die holes to be readily opened, and also allows the diameter of die holes to be easily changed to modify the size of the plastic streams produced by the extruder assembly.

Further, the present invention provides a hot oil passageway in the die assembly for maintaining the temperature of the die body at an elevated level to inhibit freezing of the plastic in the die holes, and which works in association with the aforesaid insulation device to keep the die body of the die assembly at an elevated temperature despite the possible presence of a pelletizer cooling system, or a cooler ambient temperature at the output side of the die assembly. To this end, the die assembly of the present invention is provided with a unique configuration of passageways which enhance the flow of hot oil adjacent and/or around the die holes to increase the transfer of heat to the holes through which the molten plastic is passing. Additionally, a hot oil passageway is provided in a die spider for heating the molten plastic just before it enters the die assembly.

Still further, the present invention provides a unique configuration of die holes in a die plate assembly whereby a cutter blade passing over the die plate will contact and cut the plastic streams at various points along the length of the blades to provide uniform wear of the blades.

SUMMARY OF THE INVENTION

According to the present invention, there is provided in a plastic extruder assembly of the type comprising an extruder barrel assembly, and an extruder die chamber in the distal end of the extruder barrel assembly, the die chamber having means for receiving and mounting a die assembly therein, the die assembly having die holes extending therethrough and an outer face, the improvement comprising insulating means beneath the outer face at least in the area of the die holes for inhibiting if not altogether preventing freezing of the plastic in the die holes.

Further according to the invention the die assembly of the plastic extruder includes hollow inserts received in a die insert receiving hole in a die ring, each insert being removable and replaceable in the die ring, and each insert having a passage therethrough forming one of said die holes for conveying molten plastic through the die assembly.

Still further according to the present invention there is provided in the plastic extruder assembly of the type described, a series of pasageways in the die assembly adjacent the die holes, a source of hot fluid connected to the die chamber, passages for conveying the hot fluid from the source to the die chamber and through the passageways in the die assembly for inhibiting if not altogether preventing freezing of the plastic in the die holes.

Still further according to the present invention, the die holes in the die assembly are arranged in a unique array such that the blades of the rotating cutter assembly contact and cut the strands of molten plastic at varying points along the edge of each blade, to disperse the wear on the blades and increase the usable life of the blades.

BRIEF DESCRIPTION OF THE DRAWINGS

FIG. 4 is a sectional view of the die assembly and rotating cutter assembly, taken along the line 4—4 of FIG. 3.

FIG. 5 is an elevation view of the die assembly of the present invention, taken along the line 5—5 of FIG. 4.

FIG. 6 is a sectional perspective detail view of the die assembly, taken along the line 6—6 of FIG. 5.

DESCRIPTION OF THE PREFERRED EMBODIMENTS

Figure 1:
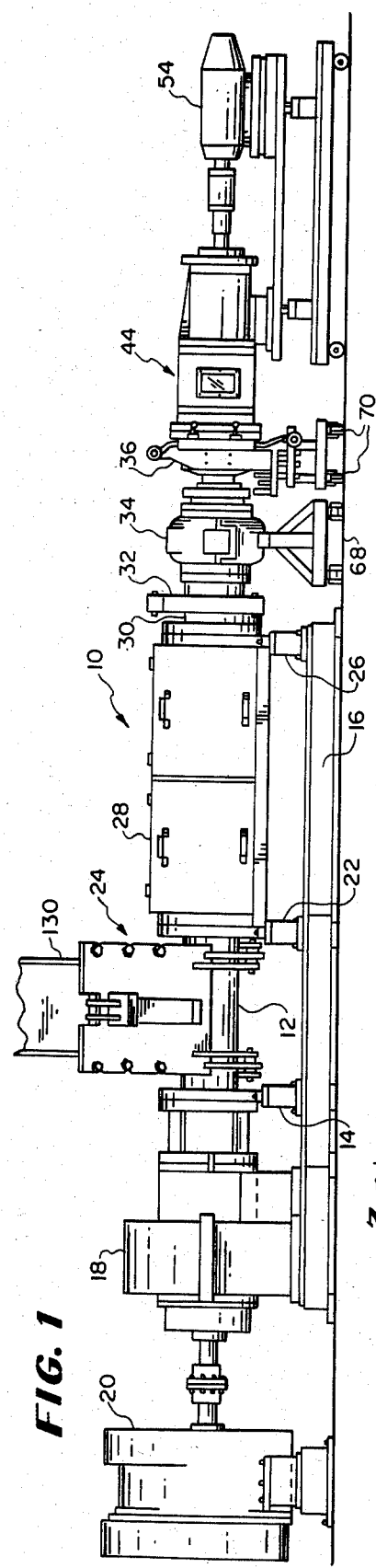
FIG. 1 is a side elevational view of the plastic extruder assembly of the present invention.

Referring now to the drawings in greater detail, there is illustrated in FIG. 1 a plastic extruder assembly 10 constructed in accordance with the teachings of the present invention.

The extruder assembly 10 includes a barrel 12 having a tapered screw (not shown) therein. One end of the barrel 12 is supported on a mounting member 14 which is fixed to a base 16 for the extruder assembly 10. Adjacent the mounting member 14 on the base 16 is a transmission 18 which is coupled to one end of the screw in barrel 12. The transmission 18 is driven by a 2000 horsepower motor 20 as shown.

The barrel 12 is supported by another mounting member 22 on the base 16. Between mounting members 14 and 22 there is positioned a double ram feed assembly 24. In the preferred embodiment, double ram feed assembly 24 is of the type disclosed in copending application Ser. No. 312,233, entitled "Extruder Assembly" filed 10/19/81. However, for purposes of the present invention, a conventional plastic feed mechanism, or any other type of feed system, may also be positioned between mounting members 14 and 22.

The barrel 12 is also supported by a third mounting member 26 on the base 16 spaced downstream from the second mounting member 24. A heating jacket 28 is positioned around the barrel 12 between mounting member 22 and mounting member 26 as shown.

The outer end 30 of barrel 12 is then clamped by means of a hydraulic clamp 32 to a screen chamber 34 which forms an extension of barrel 12. Screen chamber 34 enables material to be added to or withdrawn from barrel 12.

The end of the screen chamber 34 is clamped to a die assembly housing 36 which forms the distal end of the extruder assembly 10 and in which there is positioned a die assembly 38 (FIGS. 3, 4, 5) having multiple die holes or openings 39 therein through which a plastic material is extruded into a chamber 40 (FIG. 4) where a cutting blade assembly 42 (FIG. 4) of a pelletizer 44 (FIG. 1) is situated adjacent the die assembly 38 for cutting streams of plastic into pellets.

Typically the chamber 40 has inlet and outlet water port 46 (FIG. 4) such that water flows through the chamber 40 at 600 gal/min. by way of example, for the purpose of cooling the pellets, and for the additional purpose of removing pellets from the pellet-forming area adjacent die assembly 38 to a place away from chamber 40 where they are screened from the water and stored for future use or shipment. Cutting blade assembly 42 forms part of pelletizer 44, and includes a plurality of cutter blades 48 (FIG. 4) mounted on a blade-holding hub 50. Hub 50 is mounted on shaft 52 which is rotated by motor 54 (FIG. 1), whereby the cutter blades 48 are rotatable adjacent one face (49) of die assembly 38, as will be explained in greater detail hereinafter.

By way of example, pelletizer 44 may be of the type described in co-pending application Ser. No. 319,445, entitled "Pelletizer," or pelletizer filed 11/9/81 44 may be any standard form of pelletizer driving a blade assembly similar to that described hereinabove.

Figure 3:
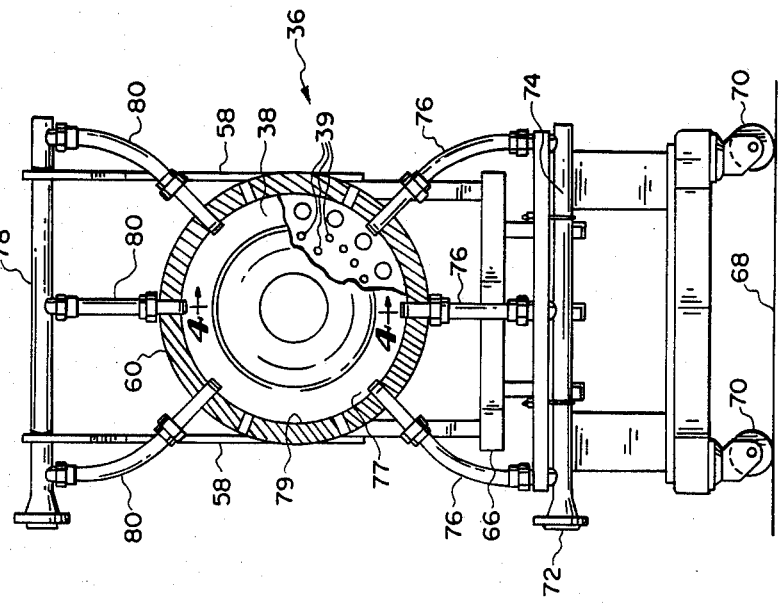
FIG. 3 is an elevation view of the die assembly and hot oil feed portion taken along line 3—3 of FIG. 2.
Figure 2:
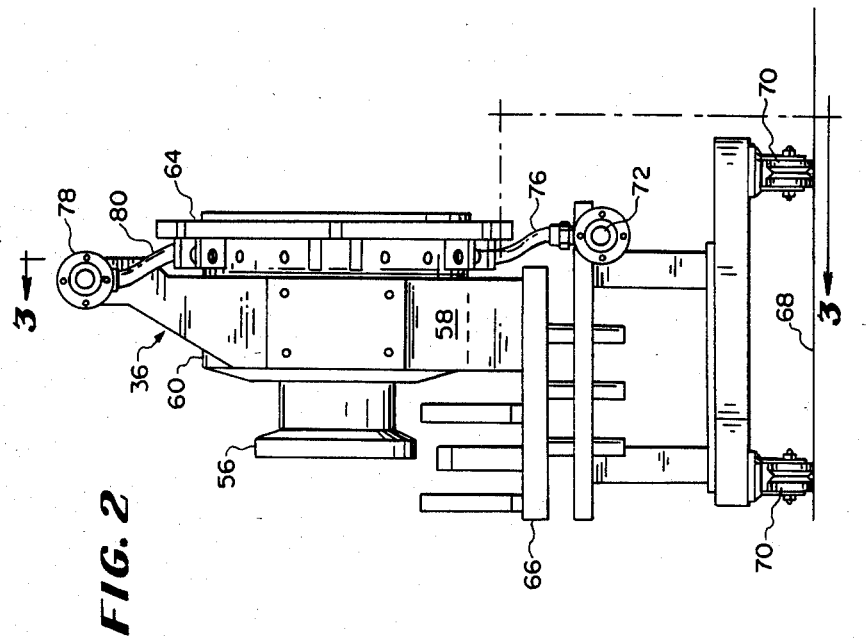
FIG. 2 is a side elevational view of the die assembly and hot oil feed portion of the plastic extruder assembly of FIG. 1.

As seen in FIGS. 2 and 3, the die assembly housing 36 of the above-described apparatus includes a flanged portion 56 which is adapted to mate with a corresponding configured flange at the right end of extruder assembly 10, as viewed in FIGS. 1 and 2, an outer support assembly consisting of opposed upright support members 58, and a circular die housing portion 60. A second flange 64 (FIG. 2) on the die housing portion 60 is attached to the pelletizer 44.

Die assembly housing 36 is mounted on a movable platform 66 which can be rolled along the floor 68 on casters 70. This enables the die assembly housing 36 to be moved into and out of its normal operating position for replacement of the die assembly 38 if the die holes 39 become clogged, or if specifications require a change in the diameter of the die holes 39.

Die assembly housing 36 also includes an oil inlet port 72 which is connected to an oil feed manifold 74. A plurality of oil input conduits 76 extend from manifold 74 through the bottom of the outer wall of the die housing portion 60 and into a chamber 77 formed inside die housing portion 60. Supported at the top of support members 58 is an oil return manifold 78, and a plurality of oil return conduits 80 extend from inside the top portion of chamber 77 or die housing portion 60, through a wall 79 of the die housing portion 60, and to oil return manifold 78.

The actual configuration and location of die assembly 38 is illustrated in FIG. 4 inside die housing portion 60 which is located at the end of extruder assembly 10. As shown, the cutting blade assembly 42 is positioned for rotation adjacent the face 49 of die assembly 38. Die assembly 38 is mounted to a unique yoke or spider 84 received in a stepped cavity 86 inside die housing portion 60 where chamber 77 forms the outer part of the stepped cavity 86. Die assembly 38 is releasably fixed by bolts 88 to a shoulder 89 in the cavity 86. Spider assembly 84 and die assembly 38 are fastened together by bolts 90. A housing wall 92 for pelletizer 44 is attached to flange 64 on die housing portion 60 by a plurality of bolts (not shown). Thus, it is an easy matter to disassemble the assembly thus formed by unbolting the die housing portion 60 from extruder 10 and pelletizer 44, and then moving platform 66 (FIGS. 2, 3) on wheels 70 to pull the die assembly housing 36 away from extruder 10 and pelletizer 44. Then, the die assembly 38 is exposed and can be removed from chamber 77 and cavity 86 by removing bolts 88 and withdrawing die assembly 38 and spider 84 to the right, as seen in FIG. 4. Spider 84 is removed from die assembly 38 by unfastening bolts 90.

The die face 49 is formed on a hard circular outer die plate 96 which is bolted to an annular die mounting ring 98 by means of bolts 100. The die mounting ring 98 is mounted to a hub 97 of spider 48 by bolts 88 and 90. Between the hub 97 and the die plate 96 and in the mounting ring 98 as a die ring 101 having die holes 39 therein. Between plate 96 and the hub 97, and the mounting ring 98 and die ring 101 is an annular ring or circular disc of insulating material 102, made of pressed asbestos or any other suitable material, and thermally separating circular plate 96 from die ring 99. A backing plate 104 is disposed between the hub 97 of the spider 84 and die mounting ring 98 and die ring 101 and is held in place by bolts 88 and 90. Thus, die assembly 38 comprises circular die plate 96, hub 97, mounting ring 98, die ring 101, insulating ring or disc 102, and backing plate 104. The insulation disc 102 can, if desired, be in the form of a ring of insulation material which is situated only between die ring 101 and plate 96.

Figure 7:
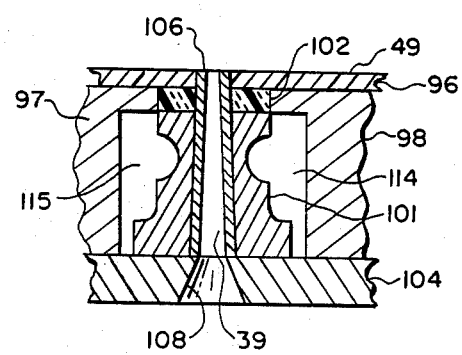
FIG. 7 is a sectional detail view of a portion of the die assembly, taken along the line 7—7 of FIG. 5.

Die ring 101 has a plurality of removable die hole inserts 106 received in mating die insert receiving holes 107 (FIG. 6) in die ring 101, insulating material 102, and circular plate 96 as best seen in FIG. 6. Openings 39 through which molten plastic passes when the apparatus 10 is operating extend through die hole inserts 106, which are conical in cross section as seen in FIG. 7. Backing plate 104 includes tapered openings 108 leading to each die hole insert 106. The die hole inserts 106 can be removed from the die insert receiving holes 107 in die ring 101 and replaced to change the configuration and/or size of the desired die holes 39.

Formed in annular die ring 101 are a plurality of radially extending passageways 112 (FIG. 6) on either side of the die hole receiving a die hole insert 106. These passageways 112 extend between inner and outer circumferentially extending passageways or chambers 114 and 115. A lower hot oil inlet port 116 extends through the wall of die housing portion 60 and die mounting ring 94 to outer passageway 114. An upper hot oil outlet port 118 also communicates in like manner with chamber 114, and is disposed at the top of die housing portion 60. Passageways 114 and 115 are disposed closely adjacent die hole inserts 106 to carry hot oil as close to the die holes 39 as possible to maintain the temperature of the die holes 39 at an elevated level, as will be explained in more detail. If desired, the die ring 101 can be formed without radial passageways 112 and with ports 116 and 118 communicating with both circumferential or annular passageways 114 and 115.

Spider 84 includes a hot oil passage 120 therein (FIG. 4) which communicates with a plurality of hot oil inlet ports 122 and hot oil outlet ports 124. Hot oil inlet ports 116 and 122 are supplied with hot oil from conduits 76 (FIG. 3), and each hot oil outlet port 124 communicates with one of conduits 80. Stepped cavity 86 also includes a large central passageway 126 which communicates with chambers 128 adjacent backing plate 104 and die hole openings 39.

The spider assembly 84 in the preferred embodiment, except for hot oil passages 120, is identical to the same assembly described in co-pending application Ser. No. 319,445, entitled "Pelletizer" filed 11/9/81. However, it is to be understood that the present invention can also be constructed with a conventional or any other spider assembly which holds die assembly 38 in place, and which allows molten plastic to pass from passageway 126 to chambers 128 and through openings 39 in the die assembly.

Figure 8:
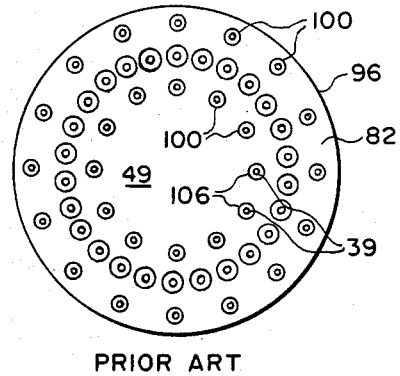
FIG. 8 is a front elevational view of a die face plate of the prior art, illustrating the die holes in a circular array in the die assembly.

A unique feature of the present invention is the provision of locating die openings 39 in die assembly 38 in such an array that blade surfaces 48 do not prematurely wear out. An example of a typical die opening array of the prior art is illustrated in FIG. 8, where the die holes 39, and associated die hole inserts 106, are disposed in a concentric array in annular ring 96 and die face 82. Referring to FIG. 4, as blades 48 are rotated by shaft 52 across die face 49 and contact plastic streams coming through die openings 39, it is apparent that the blade surfaces 48 will receive excessive wear at the same spot where the blade contacts the plastic if all of the die openings 39 are equidistant from the center of rotation of shaft 52.

To alleviate this problem, in one embodiment of the present invention the array of die openings 39 in die face 82, as shown best in FIG. 5, is such that the die openings 39 are arrayed in sets of five, with each successive opening 39 in a given set located a different distance from the central axis of die assembly 38 than the preceeding die opening 39. As seen in FIG. 5, each set of five die openings 39 form a somewhat spiral configuration. As blades 48 pass over this array of die openings 39, the blade edges cut the plastic at various points along their respective lengths, thereby avoiding excessive wear at one spot on each blade edge, and distributing the wear evenly along the length of the blades 48 to increase the useful life of the blades 48.

Figure 9:
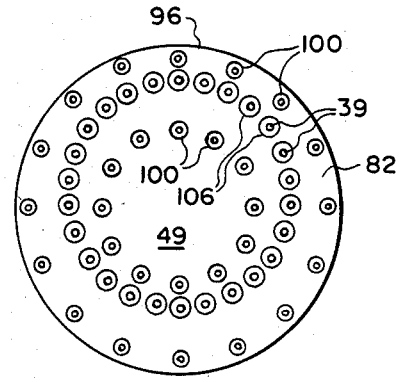
FIG. 9 is a front elevational view of another embodiment of a die plate constructed according to the teachings of the present invention, showing the die holes in an eccentric array in the die assembly.

Another embodiment of an array of die openings 39 in die face 82 is shown in FIG. 9, where the die openings 39 are arrayed in an eccentric configuration about the central axis of die assembly 38. As blade surfaces 48 pass over die face 49 having this configuration, it is apparent that various points along the blade surfaces will contact the plastic eminating from die openings 39, thereby evenly distributing the wear of the blade edges and greatly increasing the useful life of the blades 48.

In the operation of the presently disclosed extruder 10, die assembly 38 and pelletizer 44, molten plastic material is fed from a hopper 130 (FIG. 1) and is conveyed by a feed mechanism in barrel 12 to the outer end 30 of the barrel 12. The molten plastic then passes under pressure through screen chamber 34 and into central passageway 126 of die housing 60 (FIG. 4). The plastic then passes between the legs of spider 84 to chambers 128 adjacent die assembly 38, and then through die openings 39 and exits the openings 39 at die face 49 in streams much like streams of spaghetti.

At the same time, cutter blade assembly 42 is rotating at a desired rate of speed to cause knife blades 48 to cut off the streams of molten plastic into pellets. The rate of flow through openings 39 and the speed of rotation of cutter blade assembly 42 determine the length of the pellets. The pellets are quickly solidified by the water flowing through chamber 40 from water port 46.

The cool water in chamber 40 (FIG. 4) also serves to cool the die face 49 and cutter blade assembly 42. However, since it is desirable to keep the plastic in a molten state as it passes through openings 39 in die assembly 38, the insulating die or ring 102 is provided between die face 82 and die ring 101 to keep the major portion of the die assembly 38 from being cooled by the water in chamber 40.

At the same time, hot oil flowing into passage 120 of spider 84 from port 122 (FIG. 4) at temperatures in the range of 200° F. to 600° F. maintains the temperature of spider 84 and die ring 101 at an elevated temperature to prevent the molten plastic from hardening as it passes through openings 39. Insulating disc or ring 102 forms a thermal barrier between the parts of die assembly 38 which are heated by the hot oil, and die face 49 which is cooled by the water in chamber 40.

The hot oil flows into port 122 through passageways 120 and out port 122 to heat the spider and into port 116 around the die ring 101 in passageway 114 and through radial passageways 112 to circumferential passageway 115 closely adjacent the insert receiving holes 107 and die inserts 106 therein whereby the heat transfer from the hot oil through die ring 101 to die hole inserts 106 is maximized. In this manner, die hole inserts 106 are efficiently maintained at elevated temperatures as the molten plastic passes through openings 39, and the plastic is not pre-maturely hardened.

It will be apparent from the foregoing description that the plastic extruder, die assembly, and pelletizer combination of the present invention has a large number of advantages, some of which have been described above and others of which are inherent in the invention. Also it will be apparent that many modifications can be made to the apparatus of the present invention without departing from the teachings of the present invention. Accordingly, the scope of the invention is only to be limited as necessitated by the accompanying claims.

We claim:

1. In a plastic extruder assembly of the type having an extruder barrel assembly and an extruder die chamber in the distal end of said extruder barrel assembly, said die chamber having means for receiving and mounting a die assembly therein, a die assembly in said die chamber, said die assembly having extrusion orifices extending therethrough and an outer face, the improvement comprising: insulating means beneath said outer die face at least in the area of said die orifices for inhibiting if not altogether preventing freezing of the plastic in said die orifices; said die assembly comprising an annular die ring having die orifices extending therethrough; a die plate defining said face and having die inserts defining said orifices, extending therethrough; a die mounting ring extending peripherally about said die ring; said die ring including means for conveying hot fluid to and around said annular die ring and adjacent but spaced from said inserts to maintain the ambient temperature surrounding said die inserts at an elevated level thereby to keep the plastic passing therethrough molten, whereby said insulating means aid in maintaining said elevated temperature of said annular die ring which surrounds said die inserts, said conveying means comprising an outer annular passageway in said die ring, an inner annular passageway in said die ring, and radial passageways in said die ring situated between adjacent die inserts in said die ring and extending between said inner and outer annular passageways; said insulating means comprising an annular ring of insulating material which is disposed between said die plate and said die ring and which is of pressed asbestos and extensions of said die inserts extending through said annular ring of insulating material to said die insert extensions in said die plate.

2. The plastic extruder assembly of claim 1 including a pelletizer having a rotating cutter assembly with cutter blades rotatable adjacent said die face for cutting strands of plastic into pellets and means for conveying a relatively cool fluid over said die face to carry said pellets away from said die face after cutting by said rotating cutter assembly, whereby said insulating means prevents said cool fluid from freezing said molten plastic as said plastic passes through said die holes.

3. The plastic extruder of claim 2 including first means for conveying hot fluid to and around said die ring and adjacent said die holes to maintain the ambient temperature surrounding said die holes at an elevated level, and second means for conveying a relatively cool fluid over said die face as said pellets are cut by said rotating blade assembly, said insulating means acting as a barrier between said warmer portions of said die assembly and said cooler die face to prevent freezing of said molten plastic as said plastic passes through said die holes.

4. The plastic extruder assembly of claim 1 wherein said insulating means comprises an annular ring of pressed asbestoes.

5. In a die assembly adapted for extruding molten plastic through die holes in said die assembly, the improvement residing in said die assembly including: a die face plate; an annular die ring assembly; a backing plate; said die ring assembly having insert members defining extrusion orifices extending therethrough to said die face plate and having heating fluid passage means extending in said die ring assembly around said members but spaced therefrom, extensions of said members extending through said die face plate and said backing plate insulating means which are made of pressed asbestos, which have said extensions extending therethrough and which are situated between said die face plate and said die ring assembly at least in the vicinity of said members; each said insert being removable and replaceable in die ring, said inserts having different interior cross section die-forming orifices therethrough thereby to enable one easily to vary selectively the size of the molten plastic extruded through said die orifices.

6. The die assembly of claim 5 wherein said insulating means comprises an annular ring of pressed asbestos.

7. The die assembly of claim 5 wherein said insulating means comprises a disc of pressed asbestos.

8. The die assembly of claim 5 including a spider having a center hub disposed within a cavity in the end of an extruder assembly sized for receiving said die assembly, an annular die mount surrounding said die ring and being disposed between said die face plate and said backing plate, said die mount being fixed to said hub and said insulating means comprising an annular element disposed between said die face plate and said die ring.

9. The die assembly of claim 5 including a spider having a center hub disposed within a cavity in the end of an extruder assembly sized to receive said die assembly, an annular die mount surrounding said die ring and being disposed between said die face plate and said backing plate, said die mount being fixed to said hub and said insulating means comprising a disc of insulating material between said die face plate and said die ring.

10. In a plastic extruder of the type having an extruder barrel assembly and an extruder die chamber in the distal end of said extruder barrel assembly, die assembly, said die chamber having means for receiving and mounting said die assembly therein, said die assembly having die orifices extending therethrough to an outer face, the improvement residing in said die assembly comprising an annular die ring through which insert members defining said orifices extend, said die assembly having inner annular passage means and outer annular passage means extending circumferentially around and adjacent the inner and outer periphery of said die ring, means for connecting a source of hot fluid to said die assembly inner and outer annular passage means, said inner and outer annular passage means behind spaced from said insert members and adapted to convey hot fluid from said source to said die assembly and through said passage means in said die assembly to inhibit if not altogether prevent freezing of the plastic in said die orifices, said die assembly further having radial passageways extending between and communicating with said inner and outer annular passage means, said radial passageways being situated between die orifices and being adapted to receive hot fluid therethrough thereby to provide heating from the hot fluid completely around the die holes to prevent freezing of the plastic in said die orifices said die assembly including a spider disposed in said die chamber at the back side of said assembly and configured to direct molten plastic to said die orifices, said spider having passage means therein coupled to said source of hot fluid whereby heat can be imparted by said spider to the molten plastic entering the die assembly said spider including a hub, said die assembly including a backing plate forming a part thereof and being disposed between said hub and said die ring, and said die ring being fixed to said hub.

11. The plastics extruder assembly of claim 5 wherein said die inserts are disposed in said die assembly in a series of circumferentially extending spiral configurations whereby said blade edges contact said strands of plastic at varying points along the edge of each blade to disperse the wear on said blades and increase the useable life and said blades.

12. The plastics extruder of claim 11 wherein said die inserts are disposed in said die assembly in an array of said concentric circles about a center or axis which is eccentric to said central axis of said die assembly, whereby said blade edges contact said strands of plastic at varying points along the edge of said blade to disperse the wear on said blade edges along each blade to disperse the wear on said blade edges along each edge and increase the useful life of said blade edges.

* * * * *